(12) United States Patent
Pardon et al.

(10) Patent No.: US 10,040,944 B2
(45) Date of Patent: Aug. 7, 2018

(54) MODIFICATION OF POLYMER SURFACE PROPERTIES

(71) Applicant: Mercene Labs AB, Stockholm (SE)

(72) Inventors: Gaspard Pardon, Farsta (SE); Tommy Haraldsson, Järfälla (SE); Wouter Van Der Wijngaart, Sollentuna (SE)

(73) Assignee: MERCENE LABS AB, Stockholm (SE)

( * ) Notice: Subject to any disclaimer, the term of this patent is extended or adjusted under 35 U.S.C. 154(b) by 675 days.

(21) Appl. No.: 14/594,184

(22) Filed: Jan. 12, 2015

(65) Prior Publication Data
US 2015/0203687 A1    Jul. 23, 2015

(30) Foreign Application Priority Data

Jan. 10, 2014 (SE) ........................................ 1430002

(51) Int. Cl.
*C09D 4/00*     (2006.01)
*C08F 220/10*   (2006.01)

(52) U.S. Cl.
CPC .............. *C09D 4/00* (2013.01); *C08F 220/10* (2013.01); *Y10T 428/3154* (2015.04)

(58) Field of Classification Search
CPC ....................................................... C09D 4/00
See application file for complete search history.

*Primary Examiner* — Larry Thrower
(74) *Attorney, Agent, or Firm* — Porter Wright Morris & Arthur LLP

(57) ABSTRACT

Modification of polymer surface properties is disclosed by using a method comprising providing a liquid curable monomer formulation comprising a surface-active compound so that the surface active component is attracted to or repelled from at least a specific part of a master surface and is fixed in the polymer article upon curing. The method is carried out in one step and is thus simple and inexpensive to carry out.

21 Claims, 12 Drawing Sheets

MODIFICATION OF POLYMER SURFACE PROPERTIES

This application is claims priority to Swedish Patent Application No. 1430002-4, filed on Jan. 10, 2014, the entire contents of each of which are hereby incorporated by reference.

BACKGROUND

The present invention relates generally to a method of manufacturing a polymeric article with modified surface properties in one step. The manufactured polymeric article and the formulation for manufacturing the polymeric article are also encompassed.

Most polymer surface modification protocols are performed in back-end operations, i.e. after the polymer article is manufactured using plasma processing and/or chemical reactions. However, these methods suffer from limited reliability, lifetime or spatial control, and greatly increase the complexity and cost of polymeric device production. Two solutions for integrating surface modifications during device manufacturing are surface topography micro- or nano-structuring and addition of a modifier to the primary polymeric material formulation. The former suffers from lack of robustness over time, i.e. fouling of the surface nanostructures, or from complex manufacturing processes; and the latter failed so far to offer spatial control, i.e. patterning of the surface properties.

US 2009/096136 discloses a method for the micro-scale and nano-scale imprinting lithography of thiol-ene polymer using PDMS or thiol-ene molds. There are no surface-active components involved in the formulation of the polymeric material.

WO 2013/167576 discloses a method and formulation for the manufacturing of coated articles and composite, using thiol-ene-epoxy polymer, and WO 2012/042059 discloses a method for the manufacture of thiol-ene polymer articles.

WO 2008/137209 concerns the usage of a nanostructured chemical for a polymer for improving the mechanical properties of the polymer, but also for modifying its surface topography and wettability, and in which the nanostructured chemical, contribute to a number of bulk and surface properties. It is disclosed that the nanostructured chemical is selectively compounded into the polymer such that the nanostructured chemical is incorporated into a predetermined region within the polymer.

U.S. Ser. No. 13/734,446: discloses a liquid-repellent polymer coating method, in which a mixture of a polymer and of a liquid repelling material is used. There is no mention of specific interaction between the liquid repelling material and the polymer or any master surface.

WO 2014/025548: Discloses a method to prevent biofouling using a copolymer coating comprising a fluorinated compound.

US 2013/0295327: Discloses a method for the manufacturing of super-hydrophobic film, using a polymer with hierarchical micro- and nano-structures in a silicon polymer.

WO 2012/064745 discloses a method for the manufacturing of super-hydrophobic and oleophobic article with re-entrant structures at least partially covered with a perfluoroalkane and/or micro- or nano-particles.

WO 2009/009185: Discloses manufacturing of super-hydrophobic fabric using fluorinated silsesquioxanes nano-particle in a polymer coating.

Wang J J, Muck A A Jr, Chatrathi M P M, Chen G G, Mittal N N, Spillman S D S, et al. Bulk modification of polymeric microfluidic devices. Lab Chip. 2005 Jan. 31;5(2):226-30 discloses bulk modification of the surface properties, more specifically the electroosmotic mobility, of a polymer using a judicious addition of a modifier to the primary monomer solution.

Xiao Y Y, Yu X-DX, Xu J-JJ, Chen H-YH. Bulk modification of PDMS microchips by an amphiphilic copolymer. Electrophoresis. 2007 Aug. 31;28(18):3302-7. In this work, a PDMS polymer with an amphiphilic copolymer, added as an additive substance, was employed to modify PDMS microchips during the fabrication process.

Tuteja A, Choi W, Ma M, Mabry J M, Mazzella S A, Rutledge G C, et al. Designing superoleophobic surfaces. Science. American Association for the Advancement of Science; 2007 Dec. 6;318(5856):1618-22. In this work, fluorodecylPOSS is added to PMMA polymer and is shown to undergo a substantial surface migration of POSS toward the surface during solvent evaporation.

Yilgor I, Bilgin S, Isik M, Yilgor E. Facile preparation of super-hydrophobic polymer surfaces. Polymer (Guildf). 2012 Mar. 8;53(6):1180-8. Discloses a process for the manufacturing of super-hydrophobic polymer surfaces, but the process is not a single step process.

Lee, in Colloids and Surfaces B, 111 (2013), 313-320 discloses selectively hydrophobizing a microwell-patterned hydrophilic polymer substrate.

Mongkhontreerat et al, Journal of Materials Chemistry A, 1(2013), 13732 discloses a methodology for the construction of functional 3D networks with tunable properties with thiol-ene chemistry.

The inventors have published and presented the invention at Micro Electro *Mechanical Systems (MEMS), 2014 IEEE 27th International Conference*. Pardon, G.; Haraldsson, T.; van der Wijngaart, W., "Surface energy micropattern inheritance from mold to replica," *Micro Electro Mechanical Systems (MEMS)*, 2014 *IEEE 27th International Conference*, pp. 96-99, 26-30 Jan. 2014.

In view of the prior art there is a need to provide a simpler and easier method for performing a modification of the surface properties of a polymer article.

SUMMARY

It is an object of the present invention to obviate at least some of the disadvantages in the prior art and provide an improved method for modifying the surface of a polymeric article.

In a first aspect there is provided a method for the manufacturing of a solid polymeric article with controlled surface properties, the method comprising the steps of:
a) providing a liquid curable formulation comprising at least one selected from the group consisting of a monomer and an oligomer and contacting the liquid curable formulation with at least one master surface,
   wherein the at least one master surface has at least a part possessing at least one specifically selected surface property,
   wherein the liquid curable formulation comprises at least one surface-active component with at least one specifically selected functionality,
   wherein the at least one surface-active component is adapted to be spontaneously enriched or depleted in at least some volume elements in the liquid curable formulation at the interface between the liquid curable formulation and the at least one master surface,
   wherein the liquid curable formulation is contacted with the at least one master surface sufficiently long for the at least one surface-active component to be depleted or enriched in at least some volume elements in the liquid curable formulation at the interface between the liquid curable formulation and the at least one master surface,
wherein the at least one surface-active component has the ability to form a bond with the at least one selected from the group consisting of a monomer and an oligomer in the liquid curable formulation, and
b) curing the liquid curable formulation to a solid polymer to obtain a solid polymeric article, wherein at least some volume elements at the interface between the polymeric article and the at least one master surface comprises the at least one surface-active component in a higher or lower concentration compared to the average concentration of the at least one surface-active component in the bulk of the solid polymeric article.

In a second aspect, there is provided a liquid curable formulation comprising at least one selected from the group consisting of a monomer and an oligomer, wherein the formulation is liquid, wherein the liquid curable formulation comprises at least one surface-active component with a specifically selected functionality, wherein the at least one surface-active component is enriched or depleted in at least some volume elements in the liquid curable formulation at the interface between the liquid curable formulation and a master surface with the at least one specifically selected surface property when the at least one surface-active component is in the liquid curable formulation in contact with the at least one master surface, wherein the at least one surface-active component has the ability to form a bond with the at least one selected from the group consisting of a monomer and an oligomer in the liquid curable formulation.

Further aspects and embodiments are defined in the appended claims, which are specifically incorporated herein by reference.

One advantage is that the method is carried out in one step.

Another advantage is that the polymeric article is simple and inexpensive to manufacture.

BRIEF DESCRIPTION OF THE DRAWINGS

The invention is now described, by way of example, with reference to the accompanying drawings, in which the figures shows the following.

the specific layout or topology with the specifically selected surface properties (7.3, 7.4, 7.5 and 7.6) of the at least one master surface are respectively replicated at the surfaces (7.8, 7.9, 7.10 and 7.11) of the polymeric material, which results in the polymeric article (7.12).

Figure 8:
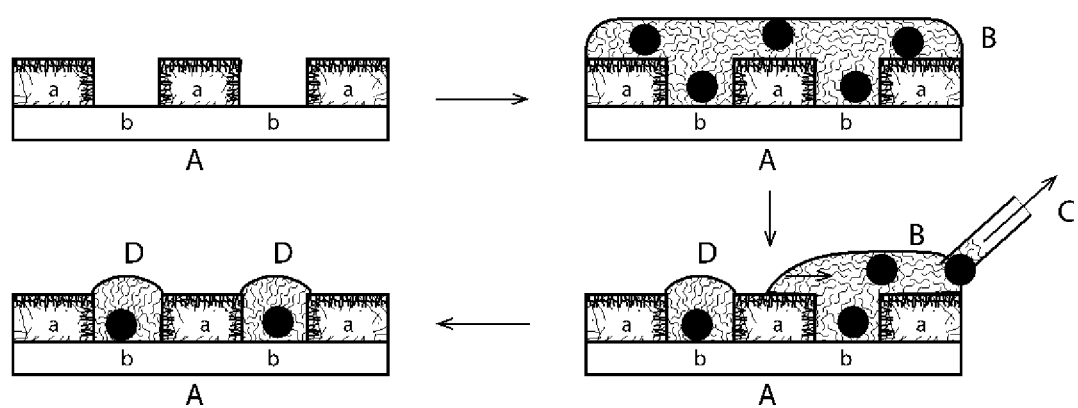

FIG. 8. A polymeric article (A) manufactured using the method has replicated through the mimicking process the at least one specifically selected surface properties (a) from at least one master surface (not shown in the figure). The polymeric article is attached to a glass surface and, as micro wells have been defined in the polymeric material during the manufacturing, the glass surface (b) is accessible at the bottom of the wells. Alternatively, the surface (b) can also be obtained directly from the at least one master surface through a mimicking process. The polymeric article (a) is submerged in a liquid solution (B), which can also contain particles, such as nanoparticles, living cells or biomolecules. The liquid solution (B) is removed from the surface of the polymeric article (A) by a force (C). During the liquid removal, droplets (D) of the solution self-assemble in the micro wells because of the replicated specifically selected surface property (b) and the liquid is repelled from the rest of the surface because of the specifically selected surface property (a). Simultaneously, if the liquid (B) contains particles, such as nanoparticles, living cells or biomolecules, these particles are trapped in individual micro wells.

Figure 9:
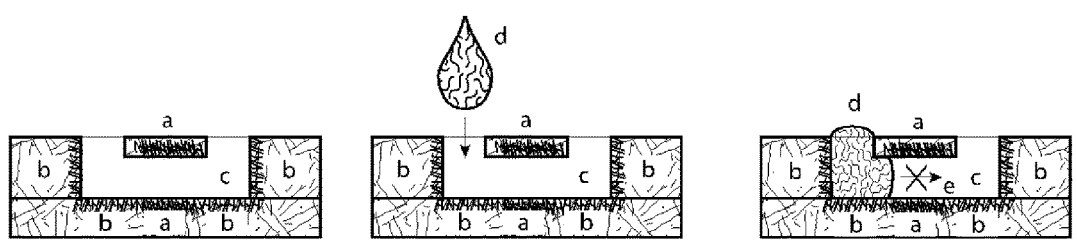

FIG. 9. Two product articles manufactured using the method have been assembled together after having each replicated through the mimicking process the at least two specifically selected surface properties (a and b) from at least two auxiliary articles (not shown in the figure). The assembly forms a microfluidic channel (c), in which liquid (d) is introduced. The liquid can fill the device because of the specifically selected surface property (b) but must stop (e) when reaching the specifically selected surface property (a). A similar microfluidic channel can also be used for the generation of micro droplets, when using a specific design of the channels and at least two immiscible liquid phases.

Figure 1A:
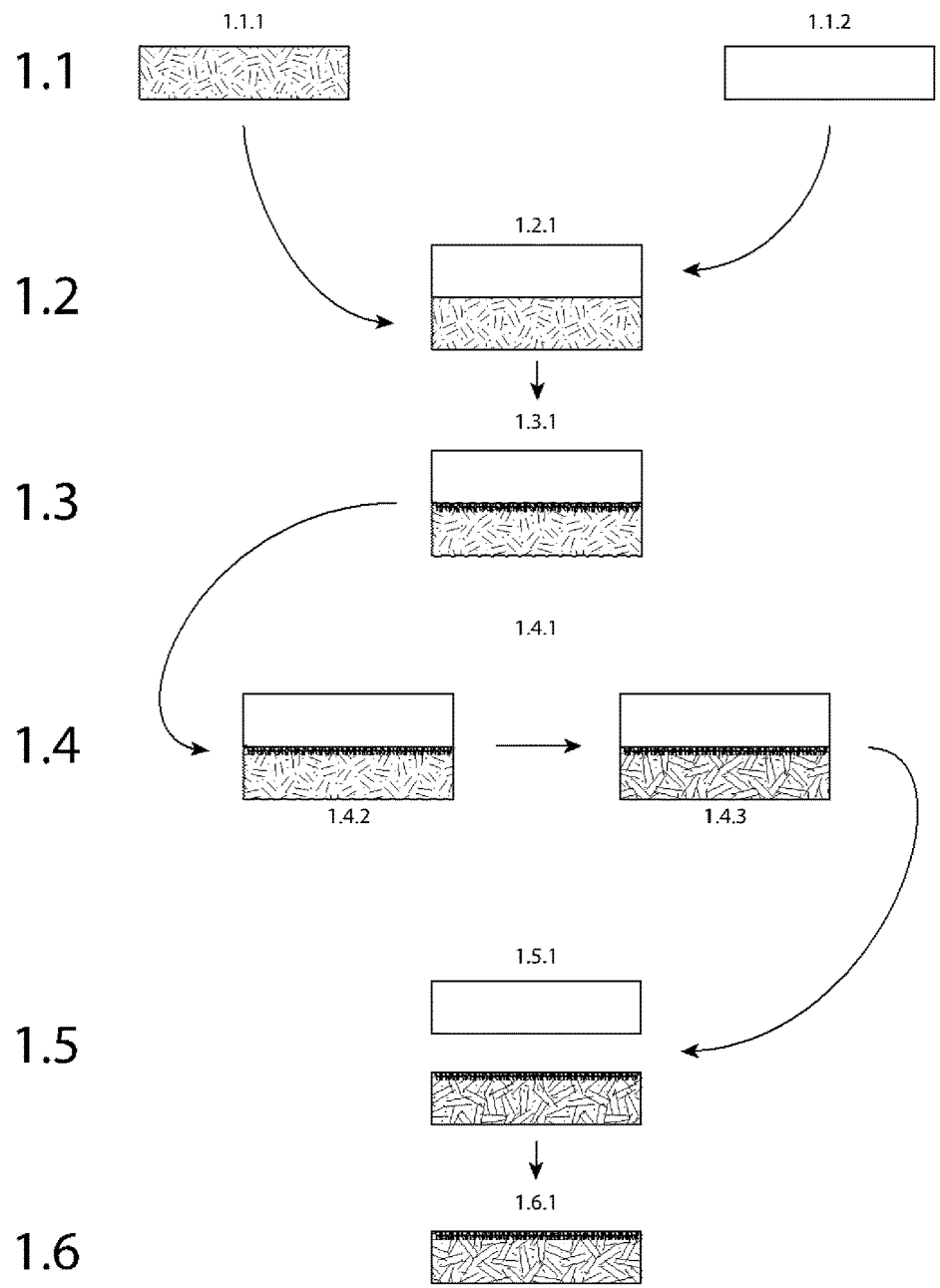
FIG. 1a. Flow chart of the process steps involved in the implementation of the invention. 1.1 The polymeric material (1.1.1) and the at least one master surface (1.1.2) are prepared. 1.2 The polymeric material is put in contact (1.2.1) with the at least one master surface. 1.3. A mimicking process occurs (1.3.1), during which the surface-active components rearrange within the polymeric material and accumulate/deplete, because of a favorable specific agent-master interaction near a specific surface areas of the at least one master surface with at least one specifically selected surface properties. 1.4 The polymeric material is transformed (1.4.1) from liquid to solid state (1.4.3). 1.5 The polymeric material is separated (1.5.1) from the master surfaces. 1.6 The polymeric material results in the polymeric article (1.6.1).
Figure 1B:
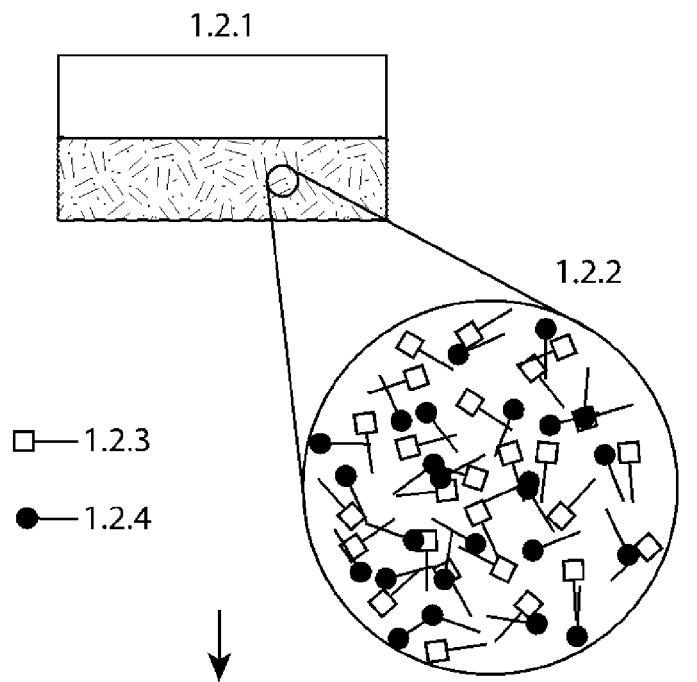
FIG. 1b. Details of the mimicking process occurring during the step 1.2 and 1.3 (see FIG. 1a) of the implementation of the invention. 1.2.2 and 1.3.2 show zoom-in in the polymeric material. 1.2.3 and 1.2.4 are represent surface-active components, which can be in different number than two, within the bulk polymer. In the mimicking process, the surface-active components rearrange within the polymeric material and accumulate/deplete near the specifically selected surface properties of the at least one master surface, with which the surface-active components experience a specific interaction, i.e. a net attractive or repulsive force.
Figure 1B:
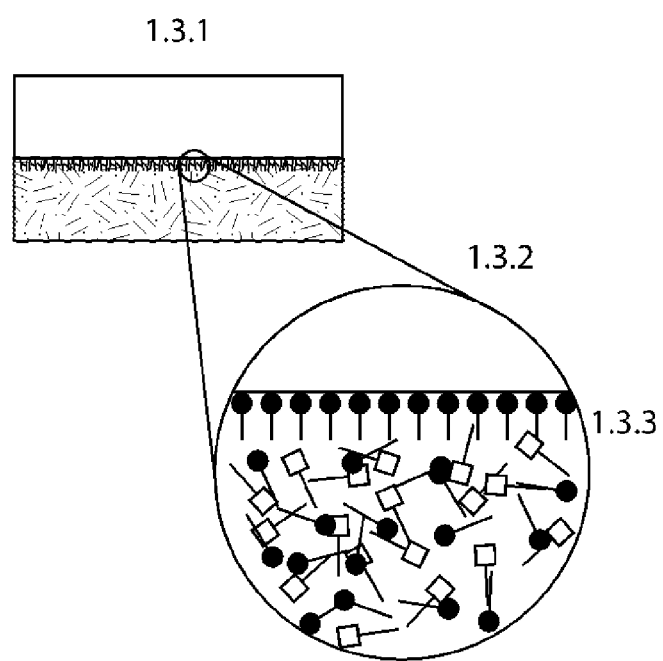
Figure 2:
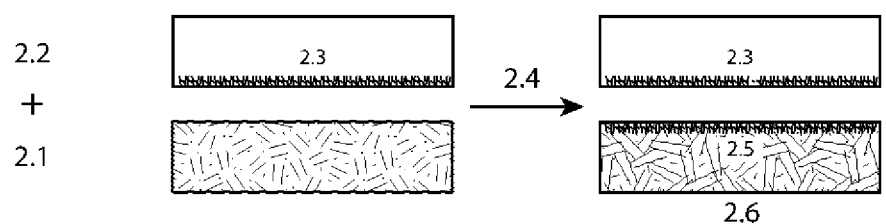
FIG. 2. A specific formulation of the polymeric material (2.1) is put in contact with a master surface (2.2) with specific surface properties (2.3). After the mimicking process and after the curing occur (2.4), the specific surface properties (2.3) of the at least one master surface are replicated at the surface (2.5) of the polymeric material, which results in the polymeric article (2.6).
Figure 3:
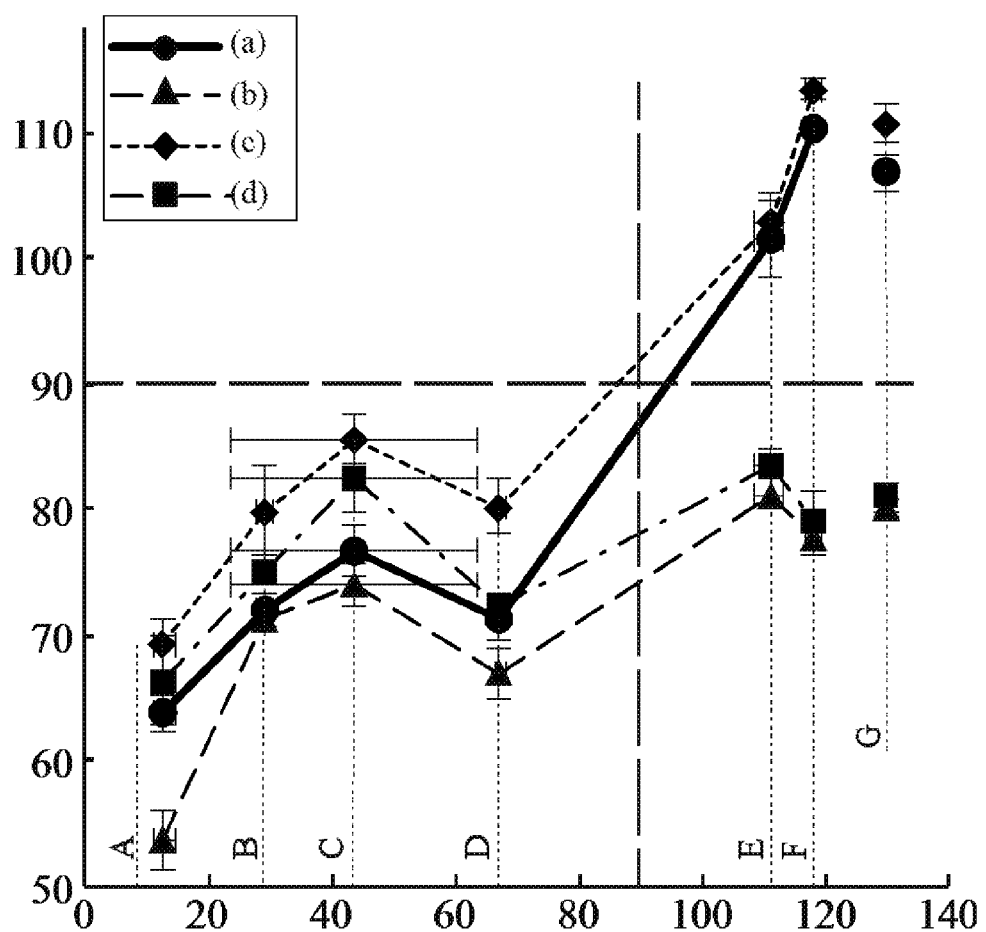
FIG. 3. Measurements of the contact angle on the surface of product articles manufactured using the invention. (a) is the polymeric formulation containing both FDMA and HEMA as surface-active component, (b) is the polymeric formulation containing only HEMA as surface-active component, (c) is the polymeric formulation containing only FDMA as surface-active component, and (d) is the polymeric formulation containing neither of FDMA and HEMA as surface-active component for comparison. The letter A corresponds to a master surface made with a glass surface, B corresponds to a master surface with a PET surface, C corresponds to a master surface with a H2O-plasma-treated hydrophilic PDMS surface, D corresponds to a master surface with a borosilicate surface, E corresponds to a master surface with a non-treated hydrophobic PDMS surface, F corresponds to a master surface with a Teflon-AF surface, and G corresponds to a master surface consisting of the surface of air.
Figure 4:
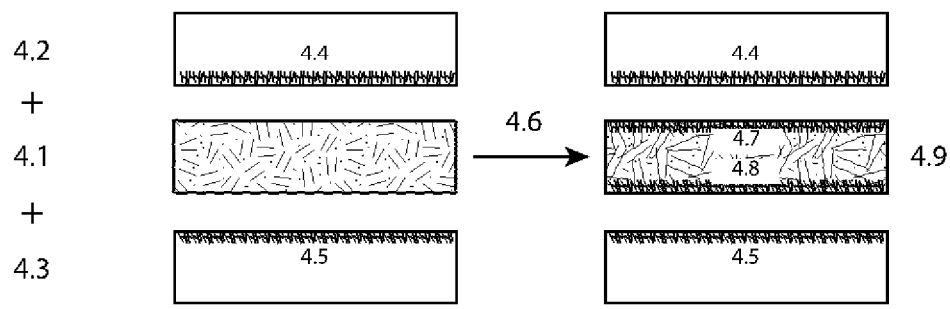
FIG. 4. A specific formulation of the polymeric material (4.1) is put in contact, on the top, with at least one master surface (4.2) with at least one specifically selected surface property (4.4) and, on the bottom, with at least one master surface (4.3) with at least one specifically selected surface property (4.5). After the mimicking process, and, if required, the curing occur, (4.6) the at least one specifically selected surface properties (4.4 and 4.5) of the two master surfaces are respectively replicated at the surfaces (4.7 and 4.8) of the polymeric material, which results in the polymeric article (4.9).
Figure 5:
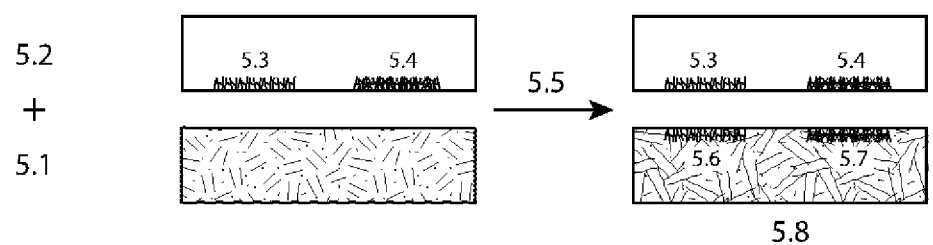
FIG. 5. A specific formulation of the polymeric material (5.1) is put in contact with at least on master surface (5.2) with at least two, and not limited to this particular layout, specifically selected surface properties (5.3 and 5.4). After the mimicking process, and, if required, the curing occurs, (5.5), the at least two specifically selected surface properties (5.3 and 5.4) of the at least one master surface are respectively replicated at the surfaces (5.6 and 5.7) of the polymeric material, which results in the polymeric article (5.8).
Figure 6:
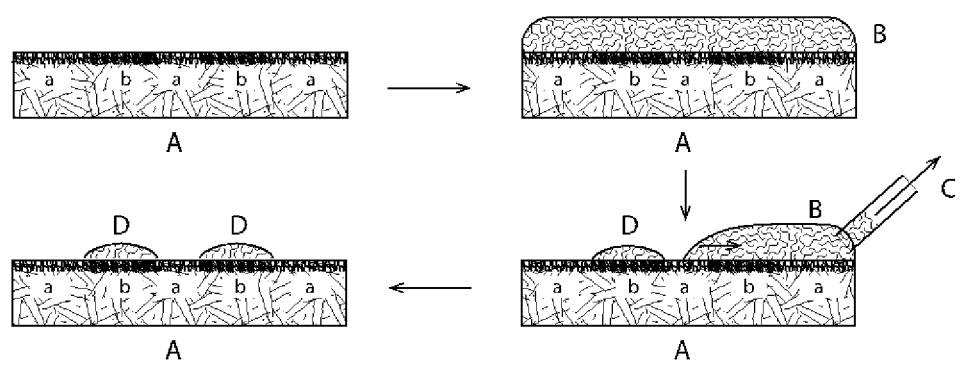
FIG. 6. A polymeric article (A) manufactured using the method has replicated through the mimicking process the at least two specifically selected surface properties (a and b) from at least one master surface (not shown in the figure). The polymeric article (a) is submerged in a liquid solution (B). The liquid solution (B) is removed from the surface of the polymeric article (A) by a force (C). During the liquid removal, droplets (D) of the solution self-assemble on the surface areas with the specifically selected surface property (b) and the liquid is repelled from the rest of the surface because of the specifically selected surface property (a).
Figure 7:
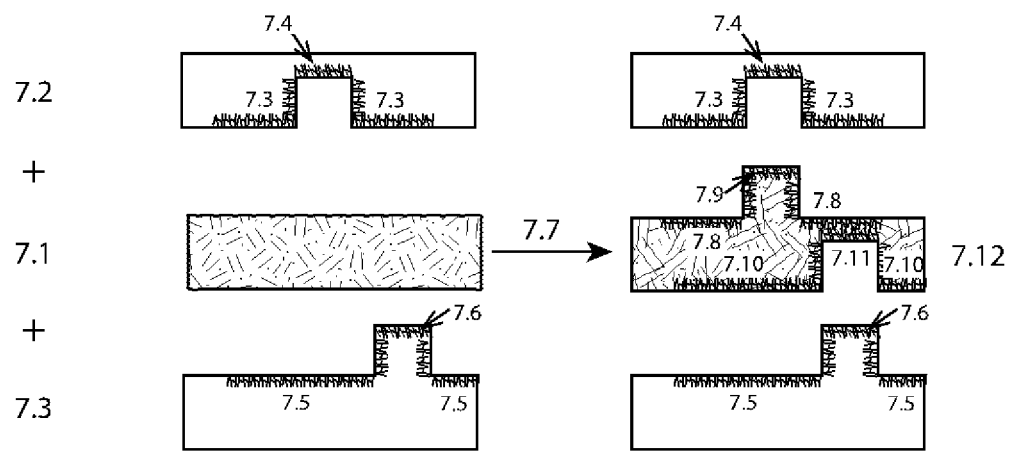
FIG. 7. A specific formulation of the polymeric material (7.1) is put in contact with at least one (as in FIG. 3.), master surface (7.2 and 7.3) with a specific, but not limited to this particular example, layout or topology with specifically selected surface properties (7.3, 7.4, 7.5 and 7.6). After the mimicking process, and, if required, the curing occurs, (7.7)
Figure 10:
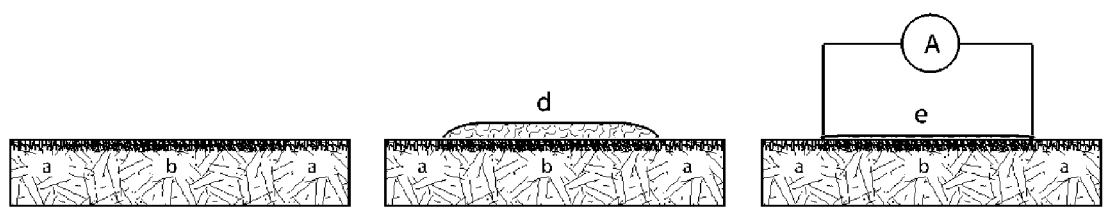

FIG. 10. A product article manufactured using the method have each replicated through the mimicking process the at least two specifically selected surface properties (a and b) from at least one master surface (not shown in the figure). Similarly to FIG. 6. The polymeric article is submerged with a solution (d), on which, upon removal of the liquid using a force, droplet self-assemble on the surface area with the specifically selected surface property (b). If the solution contains electrically conductive particles, such as metal nanoparticles, carbon nanotubes, or electrically conductive organic or inorganic molecules, these will be deposited after the evaporation of the droplet liquid. As a result, it will be possible to pass a current (A) at the surface with the property (b).

Figure 11:
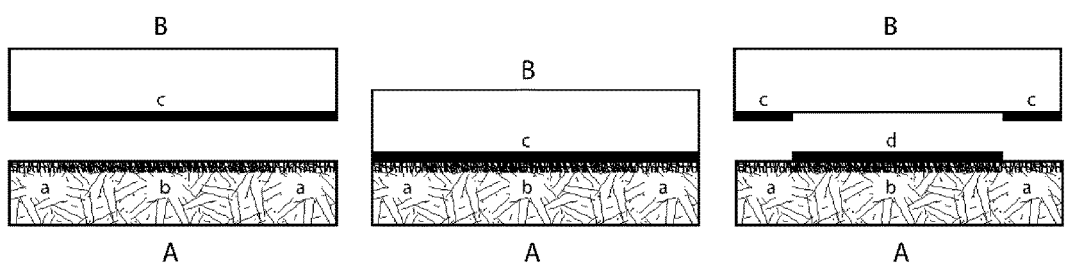

FIG. 11. A product articles (A) manufactured using the method have each replicated through the mimicking process the specifically selected surface properties (a and b) from at least one master surface (not shown in the figure). The polymeric article is put in contact with an additional article (B), which consists of a substrate covered with a layer (c). After separation, the area (d) of the layer that is in contact with the surface property (b), attaches to the polymeric article (A), i.e. is transferred to the product article, while the rest of the layer remains attached to its original substrate. The layer (c), and after transfer (d), can consist of an electrically conductive layer or ink, for example.

DETAILED DESCRIPTION

Before the invention is disclosed and described in detail, it is to be understood that this invention is not limited to particular compounds, configurations, method steps, substrates, and materials disclosed herein as such compounds, configurations, method steps, substrates, and materials may vary somewhat. It is also to be understood that the terminology employed herein is used for the purpose of describing particular embodiments only and is not intended to be limiting since the scope of the present invention is limited only by the appended claims and equivalents thereof.

It must be noted that, as used in this specification and the appended claims, the singular forms "a", "an" and "the" include plural referents unless the context clearly dictates otherwise.

If nothing else is defined, any terms and scientific terminology used herein are intended to have the meanings commonly understood by those of skill in the art to which this invention pertains.

In a first aspect there is provided a method for the manufacturing of a solid polymeric article with controlled surface properties, the method comprising the steps of:
  a) providing a liquid curable formulation comprising at least one selected from the group consisting of a monomer and an oligomer and contacting the liquid curable formulation with at least one master surface,
    wherein the at least one master surface has at least a part possessing at least one specifically selected surface property,
    wherein the liquid curable formulation comprises at least one surface-active component with at least one specifically selected functionality,
    wherein the at least one surface-active component is adapted to be spontaneously enriched or depleted in at least some volume elements in the liquid curable formulation at the interface between the liquid curable formulation and the at least one master surface,
    wherein the liquid curable formulation is contacted with the at least one master surface sufficiently long for the at least one surface-active component to be depleted or enriched in at least some volume elements in the liquid curable formulation at the interface between the liquid curable formulation and the at least one master surface,
    wherein the at least one surface-active component has the ability to form a bond with the at least one selected from the group consisting of a monomer and an oligomer in the liquid curable formulation,
    and
  b) curing the liquid curable formulation to a solid polymer to obtain a solid polymeric article, wherein at least some volume elements at the interface between the polymeric article and the at least one master surface comprises the at least one surface-active component in a higher or lower concentration compared to the average concentration of the at least one surface-active component in the bulk of the solid polymeric article.

The method is useful for preparing a polymeric article with selected surface properties as desired. The liquid formulation comprises monomers or oligomers which have the ability to polymerize to a polymer to make up the polymeric article. The polymerization reaction is encompassed in the term curing. The liquid formulation also comprises at least one surface-active component. The liquid formulation is brought into contact with a master surface with at least part of it having at least one specifically selected surface property so that this at least part of the master surface attracts or repels the surface-active component. This means that a volume element close to the surface or at the surface of the liquid curable formulation in contact with the at least part of the at least one master surface with the at least one specifically selected surface property has higher or lower average concentration of the surface-active component depending on whether the force is attractive or repulsive respectively. The net force (i.e. the absolute value of the net force) between the master surface and the surface-active component is higher than the force between the monomer (and also oligomer) and the master surface.

In one embodiment the liquid curable formulation further comprises at least one solvent.

The liquid formulation is contacted with the master surface sufficiently long so that the at least one surface-active component has time to rearrange within the liquid formulation to be enriched and/or depleted in at least some volume elements in the liquid formulation at the interface between the polymeric article and the at least part of the at least one master surface with the at least one specifically selected surface property. There will exist at least some volume elements at the surface where the average concentration of surface-active component is higher or lower compared to the average concentration in the bulk of the liquid formulation. Although possible, it is not necessary that the liquid formulation is contacted with the master surface for a period of time until equilibrium is reached, it is sufficient that some enrichment or depletion close to the surface occurs. The surface-active component is spontaneously enriched or depleted at specific parts of the master surface. The surface-active component diffuses/moves towards or away from specific parts of the master surface when the liquid curable formulation is liquid.

After the enrichment/depletion the liquid curable formulation is cured. This can be done by initiating a polymerization reaction.

After curing the surface-active component is bound to the polymer and fixed in the solid polymeric article. Then the polymeric article can be removed from the master surface(s). In one embodiment the solid polymeric article is separated from the at least one master surface. At the surface of the polymeric article there will be enrichment and/or depletion of the surface-active component as it was in the liquid curable formulation. Since the surface-active component has a certain volume it is possible to state that there will be volume elements at the interface between the polymeric article and the at least part of the at least one master surface with the at least one specifically selected surface property, which have higher or lower average concentration of the surface-active component compared to that in the bulk of the polymeric article. The bulk concentration is defined as the average concentration of the entire polymeric article. A volume element at the surface is a volume element where one side of the volume coincides with the surface of the polymeric article. One example is a cube with one side in the same plane as the surface of the polymeric article. Such volume elements can be defined at an arbitrary size within the polymeric article, but it will always be possible to define a volume element, which has a higher or lower average concentration of the surface-active component compared to that in the bulk. The volume element should however not be so small that only one or a few molecules are in the volume element. Preferably a large number of molecules should be in the volume element such as at least $10^{10}$ or preferably at least $10^{20}$ atoms.

In one embodiment the liquid curable formulation is cured with at least one selected from the group consisting of actinic radiation, an electron beam, and a spontaneous reaction among substances in the liquid curable formulation. In one embodiment the liquid curable formulation is cured with UV radiation. In one embodiment the liquid curable formulation is cured with a change of temperature. A change in temperature involves at least one selected from an increase and a decrease. Curing by heating is thus encompassed. The curing is adapted to the type of monomers and/or oligomers used in the liquid curable formulation and also to optional initiators.

In one embodiment the at least one master surface comprises a hydrophobic surface. In one embodiment the at least one master surface comprises a hydrophilic surface. In one embodiment the at least one master surface comprises a pattern of areas with different surface properties. In one embodiment the at least one master surface comprises a pattern of hydrophobic and hydrophilic areas.

In one embodiment the at least one master surface is flat. In an alternative embodiment the at least one master surface has a three dimensional shape. Thus the at least one master surface is a mold for the polymeric article. Thus it is possible to manufacture articles with a desired shape and with desired surface properties at selected spots and/or regions at the article.

In one embodiment the at least one surface-active component comprises a group with a specific selected chemical functionality. In one embodiment the at least one surface-active component comprises at least one hydrophilic group. In one embodiment the at least one surface-active component comprises at least one hydrophobic group. The surface-active component and the master surface are adapted to each other so that a desired enrichment or depletion occurs and so that the desired surface properties of the polymeric article arise.

In one embodiment the at least one surface-active component comprises at least one group selected from the group consisting of an acrylate, a silane, a thiol, an ene, an yne, a vinyl, a hydroxyl, an epoxide, carboxylic acid, isocyanate, and an amine. Such a group has the ability to participate in a chemical reaction to give for instance a covalent bond, such as a covalent bond to the polymer in the polymeric article.

In one embodiment the at least one surface-active component comprises at least one selected from the group consisting a metal, a nanoparticle, a particle with a maximum diameter up to 1000 nm, a microparticle, a protein, an amino acid, a DNA molecule, and an RNA molecule. The maximum diameter of a particle is defined as the largest possible diameter for an irregular particle.

In one embodiment the liquid curable formulation further comprises an initiator adapted to initiate the curing in step b).

In one embodiment the at least one master surface comprises a surface of a material selected from the group consisting of glass, silicon, metal, ceramics, and polymeric material.

In an alternative embodiment the at least one master surface is the surface of a liquid. Then the liquid curable formulation and the other liquid should not be miscible. In yet another alternative embodiment the at least one master surface is the surface of a gas.

In one embodiment the liquid curable formulation comprises at least one compound with a functional group selected from the group consisting of thiol, ene, yne, acrylate, methacrylate, and epoxide.

After curing the master surface(s) are removed from the polymer article. Optionally the polymeric article is subjected to conventional treatment(s) for molded polymeric articles such as additional thermal treatment or further surface modification treatments.

In a second aspect there is provided a liquid curable formulation comprising at least one selected from the group consisting of a monomer and an oligomer, wherein the formulation is liquid, wherein the liquid curable formulation comprises at least one surface-active component with a specifically selected functionality, wherein the at least one surface-active component is enriched and/or depleted in at least some volume elements in the liquid curable formulation at the interface between the liquid curable formulation and a master surface with the at least one specifically selected surface property when the at least one surface-active component is in the liquid curable formulation in contact with the at least one master surface, wherein the at least one surface-active component has the ability to form a bond with the at least one selected from the group consisting of a monomer and an oligomer in the liquid curable formulation.

In one embodiment the formulation comprises at least one compound with a functional group selected from the group consisting of thiol, ene, yne, acrylate, methacrylate, and epoxide.

In one embodiment the formulation comprises at least one selected from the group consisting of a metal, a nanoparticle, a protein, an amino acid, a DNA molecule, and an RNA molecule.

In one embodiment the liquid curable formulation further comprises an initiator adapted to initiate a curing process.

In a third aspect there is provided a polymer article manufactured as described in any of the embodiments of the method described above.

In a fourth aspect there is provided a number of different uses of the polymer article. In one embodiment the polymeric article is used for performing an analysis. In one embodiment the polymeric article is used for manufacturing of a micro well analysis device. In one embodiment the polymeric article is a device with micro scale or nanoscale features. Micro scale and nano scale refers to features with the size in the intervals $1\text{-}100^{th}$ μm and $1\text{-}100^{th}$ nm respectively. In one embodiment the polymeric article is a polymeric article comprising conducting paths on the surface. In one embodiment the polymeric articles is a polymeric article with a conducting surface. In one embodiment the polymeric articles is used as a polymer coating. In one embodiment the polymeric article is used for manufacturing of bio-functionalized polymeric article. In one embodiment the polymeric article is used for manufacturing of a polymer articles with surfaces having anti-biofouling properties.

Using the invention, polymeric articles can be prepared, on which straight and curved line patterns with hydrophilic properties can be defined with a hydrophobic surrounding surface area. Using these hydrophilic patterns, it is possible to locally retain a liquid solution containing either or both biomolecule or electrically conductive particles or other solid particles, such a gold nanoparticles or carbon nanotubes that will attach to the substrate upon drying of the liquid solution. Through this process, the biomolecule will be used to bio-functionalize the surface to perform biochemical assay analysis and/or the electrically conductive nanoparticles will end up touching each other, which will form an electrically conductive path. Application of such manufacturing process is useful for the manufacturing of microarray substrates and/or printed electronic components and substrates and for the manufacturing of transparent and flexible displays.

The invention is in one embodiment utilized to manufacture polymer substrates that are electrically conductive by using electrically conductive surface-active components. Such agents can be electrically conductive monomers, such as those used to make PEDOT:PSS (Poly(3,4-ethylenedioxythiophene) Polystyrene sulfonate) polymers, metallic nanoparticles, graphene particles or carbon nanotubes. When these surface-active components experience a favorable interaction with a specific selected surface property of a master surface, they will accumulate at the surface of the polymeric article to form a conductive layer or path, if a pattern exists on the master surface.

In one embodiment of the invention, biomolecules, such as proteins, DNA molecules, RNA molecules, nucleotides, lipid proteins, membrane proteins, peptides, are used as surface-active components. When the master surface is prepared with a surface that possess some kind of bio-recognition, i.e. favorable specific agent-auxiliary interaction, for a specific biomolecule used as surface-active component, the surface-active component will accumulate at the surface because of the favorable agent-auxiliary interaction and be expressed at the surface of the polymeric article. In this case, the polymeric article will obtained the bio-molecular functionalization through the mimicking process during its manufacturing.

In one embodiment manufacturing of conductive polymer substrates by local and selective transfer of metal line to a polymeric article manufactured is performed. For this, the invention is used to fabricate a polymeric article, on which specific areas have a specific selected surface property obtained through the mimicking process, where the adhesion of metal is high, while the rest of the surface obtains a low adhesion. Because of the high adhesion properties, these areas will be able to bind to a metal layer deposited on another substrate, which will be transferred to the polymeric article if this other substrate possesses a lower adhesion with the metal. For example, gold can be transferred to thiol-surfaces from a silicon wafer, when no specific adhesion layer is used on the latter. The ability to manufacture several polymeric articles from one master surface and the ability to pattern the surface properties at the same time enable to do this transfer using a roll-to-roll process for larger scale manufacturing.

In one embodiment manufacturing of a polymer article with anti-biofouling surface properties is performed. In this use of the invention, surface-active components are chosen because of their anti-biofouling properties. A master surface possessing a surface property enabling the mimicking process through a specific agent-auxiliary interaction is prepared. The polymeric article in manufactured using the method and the polymeric material made with the selected anti-biofouling surface-active components.

EXAMPLES

Example 1

In this use of the invention, the surface hydrophilicity or hydrophobicity, specific surface properties of various master surfaces, was replicated in polymeric articles using the invention.

For this, three different polymeric material formulations were prepared. As bulk polymer, a mixture of the following monomer PETMA: Pentaerythritol tetrakis(2-mercaptoacetate) (Sigma-Aldrich Co., USA) and TAOE (Tetraallyloxyethane) (Tokyo Chemical Industry Co., Ltd., Japan) was prepared. The mixing ratio of these two monomers was varied to obtain stoichiometric and off-stoichiometric thiol-ene (OSTE) prepolymer formulations. Notably, a formulation containing 80% more thiol groups then ene groups was prepared and tested, for which the mixing ratio was 24.55% wt TAOE and 74.15% wt PETMA.

To these bulk polymer formulations was added 0.5% wt of either, or both, the following surface-active component monomer(s): FDMA (3,3,4,4,5,5,6,6,7,7,8,8,9,9,10,10,10-Heptadecafluorodecyl methacrylate) and HEMA (2-Hydroxyethyl methacrylate). Methacrylates monomers can react covalently with thiol or allyl monomers, providing a strong agent-bulk interaction, while the hydrophilic and, respectively, hydrophobic groups of the respective monomers experience a favorable agent-auxiliary interaction with the hydrophilic and, respectively, hydrophobic surface property of the master surfaces. Prior to add these monomers to the bulk polymer, each was diluted in toluene, using a 20% wt and respectively 5% wt ratio.

These polymeric material formulations were processed according to the method. This means that the polymeric material was put in contact with specific master surfaces with different specific surfaces properties, e.g. glass, Polyethylene terephthalate (PET), H2O-plasma treated PDMS, Borosilicate glass, non-treated PDMS, Teflon-AF and in open-air. In practice, this means that each polymeric material formulation was sandwiched between a supporting substrate and one of the master surfaces, using a 500 µm-thick film as interspacing and one sample was also processed on a supporting substrate with the top side exposed to the ambient air.

Time was given for the mimicking process to occur, around 5 min. The polymeric material was then cured by cross-linking the monomers, i.e. the polymeric material components. This cross-linking polymerization was performed using UV light, using a collimated 12 mW cm-2 near-UV mercury lamp (OAI, Milpitas, USA) with 8 s exposure time and 0.3% wt of TPO-Luciren photoinitiator was used to initiate the cross-linking.

The master surfaces were carefully removed and the replicated surfaces on the polymeric article were subsequently rinsed using IPA and dried using nitrogen gas, before characterization of the surface property with contact angle measurements. Contact angles were measured using 5 µl droplets using the Contact angle plugin of the ImageJ software. A minimum of 6 droplets per sample were measured. The contact angles of the master surfaces were measured before and after being used to manufacture the polymeric articles to verify that no material transfer from the master surface to the polymeric article could be the cause behind the observed mimicking process.

The specific surface energy of the manufactured polymeric articles was compared using contact angle measurement with that of articles manufactured using the same procedure but using the bulk polymer only as polymeric material, i.e. without added surface-active components. The measurement data clearly demonstrated the replication of the surface energy of the master surfaces via the mimicking process for the formulation using surface-active component (s): the polymeric material formulation using the FDMA surface-active component could mimic the hydrophobic surface property of non-treated PDMS, Teflon AF and open-air; the polymeric material formulation using the HEMA could mimic the hydrophilic surface property of glass, borosilicate glass, Polyethylene terephthalate (PET) and H2O-plasma-treated PDMS. The polymeric material formulation using both surface-active components could mimic all properties. The difference in contact angle between the hydrophilic substrates and the polymer replica, i.e. polymeric article, is due to the choice of HEMA as surface-active component, which only possess a single hydrophilic group, as compared to the many more groups possessed by the hydrophobic FDMA, which provided more accurate mimicking of the hydrophobic properties. A different choice for the hydrophilic surface-active component could provide better results. A potential alternative choice to HEMA could be maleic acid, for example.

The contact angles were measured on the replicated surfaces on the polymeric article, $\theta r$, and were compared to the contact angle of the master surface surfaces, $\theta a$. The measurement demonstrated that the polymeric material in the polymeric article is hydrophilic ($\theta r\_glass=63°$) when cured against a hydrophilic glass master surface ($\theta m\_glass=13°$) and hydrophobic ($\theta r\_Teflon=110°$) when cured against a hydrophobic Teflon-AF master surface ($\theta a\_Teflon=118°$), resulting in that the invented polymeric material formulation used in this experiment inherits the surface energy of an master surface and that the surface of the polymeric article can be hydrophilic or hydrophobic depending on the master surface energy. In comparison, the contact angle of polymeric article surfaces manufactured using the bulk polymer alone, i.e. without any surface-active component, only varies slightly when process under the same conditions. The minute change is likely due to replication of varying surface topology between the various master surfaces rather than a mimicking of the surface energy.

Two observations support that the contact angle is determined by a rearrangement of the surface-active components within the polymeric material, and not by a material transfer from the master surface to the polymeric article. First, a clear differentiation of the resulting contact angle is observed for the different polymeric material formulations on the various master surfaces used. Second, processing the polymeric material formulations in open-air or in contact with Teflon-AF surface of a master surface results in comparable contact angles, and this both for the polymeric material formulation with both surface-active components $\theta r\_Teflon \approx \theta r\_air$, and for the polymeric material formulation made with the bulk polymer alone, $\theta r\_Teflon \approx \theta r\_air$.

Since the functional methacrylate monomers are polymerized with the bulk polymer via covalent bonds, the replica surface modifications are robust and experimentally verified to last for at least 2 months.

Since then, the above-mentioned use of the invention has been tested using other polymeric material formulations:

Bulk polymers have been formulated using various thiol and ene monomers. The following thiol monomers have been used: TMPEIC: Tris[2-(3-mercaptopropionyloxyl) ethyl]isocyanurate; PETMA: Pentaerythritol tetrakis(2-mercaptoacetate); PETMP: Pentaerythritol tetrakis(3-mercaptopropionate). The following ene monomers have been used: TATATO: 1,3,5-Triallyl-1,3,5-triazine-2,4,6(1H,3H,5H)-trione; TAOE: Tetraallyloxyethane.

Additionally, bulk polymers have been formulated using a choice of the above thiol and ene monomers and an additional epoxy monomer: BADGE: bis(2,3-epoxypropyl) ether or Bisphenol A diglycidyl ether. Other epoxy monomers can potentially be used, such as: TGIC: Tris(2,3-epoxypropyl) isocyanurate; PMPTE: Trimethylolpropane triglycidyl ether; DEN 431: Epoxy Novolac Resin from Dow Chemical Inc.; AGE: Allyl glycidyl ether; Albipox 3000: commercial epoxy from Evonik Inc. Polymeric material formulations have also been tested using commercially available bulk polymer OSTEmerX 322-40 crystal clear purchased from Mercene Labs AB.

Additionally, fluorinated silanes monomers have also been used as surface-active components. Silanes are able to form covalent bond with epoxy groups, i.e. providing a strong agent-bulk interaction, while the fluorinated groups enable the mimicking of hydrophobic surface properties.

Example 2

Manufacturing of polymer film or coating with different surface properties on either sides. In this use of the invention, the polymeric material is processed in sandwich between two master surface with similar or different surface properties, as an example: a super-hydrophobic master surface, with low surface energy and hierarchical micro and nanoscale topology, on one side and a hydrophilic master surface with specific chemical properties for enhanced adhesion on the other side, separated with a thin spacer. The resulting polymeric article is a film with a super-hydrophobic surface on one side and a hydrophilic and chemically functionalized surface on the other side.

Example 3

Using one of the polymeric material formulations were prepared in Example 1, a polymeric article was manufactured with a microarray of different specific surface properties. During the manufacturing of this polymeric article, the invention was used to replicate from a master surface, a pattern of different specific surface properties. The latter surface properties consisted in hydrophilic surface areas surrounded by a hydrophobic surface. The hydrophilic areas were designed in a regular pattern of disks with dimensions in the range of tens to hundreds of micrometers, which we call a micropattern. This finds application in the manufacturing of microarray substrates.

The polymeric article was used to demonstrate the self-assembly of micro droplets on the hydrophilic areas. This self-assembly was performed using a solution consisting of water, isopropanol and dye. The polymeric article with patterned surface properties was submerged in this solution. By withdrawing the polymeric article from the solution, droplets are retained on the hydrophilic surface areas, while no solution adhere to the hydrophobic areas.

For this use of the invention, a mixture of the two monomers: PETMA: Pentaerythritol tetrakis(2-mercaptoacetate); and TAOE (Tetraallyloxyethane) was prepared as bulk polymer. The mixing ratio of these two polymers was 24.55% wt TAOE and 74.15% wt PETMA.

To these bulk polymer formulations was added both of the following surface-active component monomers: FDMA (3,3,4,4,5,5,6,6,7,7,8,8,9,9,10,10-Heptadecafluorodecyl methacrylate) and HEMA (2-Hydroxyethyl methacrylate), both in a 0.5% wt ratio. As in 4.1 1_, each was preliminary diluted in toluene, using a 20% wt and respectively 5% wt ratio.

This formulation enabled the simultaneous replication of the micro patterned hydrophilic and hydrophobic surface areas using the mimicking process.

The master surface was prepared using a glass substrate, on which a nanometer-thin Teflon-AF layer was deposited. To obtain the pattern, which is replicated using the invention, a regular array of circular areas was protected using a PDMS stamp, prior underfilling the stamp with the Teflon-AF solution and curing in an oven to remove the Teflon-AF solvent. After removal of the stamp, the stamp-protected areas consist of hydrophilic glass, while the non-protected areas are covered with the nanometer thin Teflon-AF layer.

Example 4

In this use of the invention, both the surface topography and the surface physic chemical property, such as the hydrophobicity, of a specific master surface, was replicated in polymeric articles. The polymeric article consists in a glass substrate, on which a thin layer/coating of the polymeric material was imprinted with a regular pattern of hydrophilic-in-hydrophobic micro wells. This enables the self-assembly of femtoliter droplets in the micro wells. Moreover, micro particles or single living cells can be trapped in the wells for single molecule or single cell analysis, which was demonstrated using fluorescent microparticles. The microwell can also be used for the manufacturing of micro lenses via self-assembly and curing of polymer droplets.

For this use of the invention, a polymeric material formulation was prepared using OSTERmerX 322-40 crystal clear, purchased from Mercene Labs AB, as bulk polymer and FDMA (3,3,4,4,5,5,6,6,7,7,8,8,9,9,10,10,10-Heptadecafluorodecyl methacrylate) as surface-active component, mixed in a 3% wt ratio. The FDMA was preliminary diluted in toluene in 15% wt ratio.

SEM imaging and EDX measurements have been performed to analyze the replication of the complex topographies and the spatial distribution of the surface-active components in the polymeric articles and confirmed that both the effective replication of the topography and of the surface properties. Contact angle measurements have also confirmed the mimicking of the surface energy of the PDMS stamp surface property.

Example 5

Manufacturing of microfluidic devices for lab-on-chip applications, where the invention is used to obtain microchannel surfaces with hydrophilic or hydrophobic properties. This is useful in a number of application, such as: passive valves enabling control of the fluid flow; in the manufacturing of droplet microfluidics microchips, in which two immiscible liquid phase are put in contact and results in the formation of micro droplets of one fluid in the other fluid, which is also called an emulsion, and where hydrophobicity of the channel wall is needed to avoid droplet stiction; or in the manufacturing of antifouling surfaces, when working with sensitive biological samples, such as blood.

For this use of the invention, a polymeric material formulation was prepared using a mixture of PETMP: Pentaerythritol tetrakis(3-mercaptopropionate), TATATO: 1,3,5-Triallyl-1,3,5-triazine-2,4,6(1H,3H,5H)-trione and DEN 431: Epoxy Novolac Resin from Dow Chemical Inc., for the bulk polymer, and one or several of the following surface-active components were added: FDMA (3,3,4,4,5,5,6,6,7,7,8,8,9,9,10,10,10-Heptadecafluorodecyl methacrylate), HEMA (2-Hydroxyethyl methacrylate) and FDS: (Heptadecafluoro-1,1,2,2-tetrahydrodecyl)trimethoxysilane.

The prepared polymeric material formulations were processed by injection into a PDMS mold, containing micro structured micro channels, and UV curing. Time was given for the mimicking process to occur prior to UV curing. UV curing initiated the transformation of the polymeric material from its liquid state, to a solid state, by cross-linking the PETMP and TATATO monomers, i.e. the first two polymeric material components. 0.3% wt of TPO-Lucirin photoinitiator was used to initiate the cross-linking. Thermal curing was further performed after demolding to finalize the cross-linking by reacting the remaining PETMP, mixed in excess with respect to the TATATO monomers, and DEN 431 monomers. The initiation of this second curing process was enabled by the use of a photo latent base from BASF. During the first curing process, the surface agents with methacrylate groups can react with the thiol groups and during the second curing process the surface agents with silane groups can react with the epoxy groups present in the bulk polymer to result in a strong agent-bulk interaction.

Contact angle measurements were performed and confirmed the mimicking of the hydrophobic surface properties of the PDMS mold. The polymeric article was further processed to result in a functional microfluidic chip for microdroplet generation, demonstrating both the replication of the surface topology and of the surface property of the PDMS mold used as master surface.

All the described alternative embodiments above or parts of an embodiment can be freely combined without departing from the inventive idea as long as the combination is not contradictory.

Other features and uses of the invention and their associated advantages will be evident to a person skilled in the art upon reading the description and the examples.

It is to be understood that this invention is not limited to the particular embodiments shown here. The embodiments are provided for illustrative purposes and are not intended to limit the scope of the invention since the scope of the present invention is limited only by the appended claims and equivalents thereof.

The invention claimed is:

1. A method for manufacturing of a solid polymeric article with controlled surface properties, the method comprising the steps of:
   a) providing a liquid curable formulation comprising at least one selected from a group consisting of a monomer and an oligomer and contacting the liquid curable formulation with at least one master surface,
      wherein the at least one master surface has at least a part possessing at least one specifically selected surface property,
      wherein the liquid curable formulation comprises at least one surface-active component with at least one specifically selected functionality,
      wherein the at least one surface-active component is adapted to be spontaneously enriched or depleted in at least some volume elements in the liquid curable formulation at the interface between the liquid curable formulation and the at least one master surface,
      wherein the liquid curable formulation is contacted with the at least one master surface sufficiently long for the at least one surface-active component to be depleted or enriched in at least some volume elements in the liquid curable formulation at the interface between the liquid curable formulation and the at least one master surface,
      wherein the at least one surface-active component has the ability to form a bond with the at least one selected from the group consisting of a monomer and an oligomer in the liquid curable formulation, and
   b) curing the liquid curable formulation to a solid polymer to obtain a solid polymeric article, wherein at least some volume elements at the interface between the polymeric article and the at least one master surface comprises the at least one surface-active component in a higher or lower concentration compared to the average concentration of the at least one surface-active component in the bulk of the solid polymeric article.

2. The method according to claim 1, wherein the liquid curable formulation is cured with at least one selected from the group consisting of actinic radiation, an electron beam, and a spontaneous reaction.

3. The method according to claim 1, wherein the liquid curable formulation is cured with UV radiation.

4. The method according to claim 1, wherein the liquid curable formulation is cured with a change of temperature.

5. The method according to claim 1, wherein the at least one master surface comprises a hydrophobic surface.

6. The method according to claim 1, wherein the at least one master surface comprises a hydrophilic surface.

7. The method according to claim 1, wherein the at least one master surface comprises a pattern of areas with different surface properties.

8. The method according to claim 1, wherein the at least one master surface comprises a pattern of hydrophobic and hydrophilic areas.

9. The method according to claim 1, wherein the at least one master surface is flat.

10. The method according to claim 1, wherein the at least one master surface has a three dimensional shape.

11. The method according to claim 1, wherein the at least one surface-active component comprises a group with a specific selected chemical functionality.

12. The method according to claim 1, wherein the at least one surface-active component comprises a hydrophilic group.

13. The method according to claim 1, wherein the at least one surface-active component comprises a hydrophobic group.

14. The method according to claim 1, wherein the at least one surface-active component comprises at least one group selected from the group consisting of an acrylate, a silane, a thiol, an ene, an yne, a vinyl, a hydroxyl, an epoxide, an isocyanate, a carboxylic acid, and an amine.

15. The method according to claim 1, wherein the at least one surface-active component comprises at least one selected from the group consisting a metal, a nanoparticle, a particle with a maximum diameter up to 1000 nm, a microparticle, a protein, an amino acid, a DNA molecule, and an RNA molecule.

16. The method according to claim 1, wherein the liquid curable formulation further comprises an initiator adapted to initiate the curing in step b).

17. The method according to claim 1, wherein the at least one master surface comprises a surface of a material selected from the group consisting of glass, silicon, metal, ceramics, and polymeric material.

18. The method according to claim 1, wherein the at least one master surface is the surface of a liquid.

19. The method according to claim 1, wherein the at least one master surface is the surface of a gas.

20. The method according to claim 1, wherein the liquid curable formulation comprises at least one compound with a functional group selected from the group consisting of thiol, ene, yne, acrylate, methacrylate, an isocyanate, a carboxylic acid, and epoxide.

21. The method according to claim 1, wherein the solid polymeric article is separated from the at least one master surface.

* * * * *

UNITED STATES PATENT AND TRADEMARK OFFICE
CERTIFICATE OF CORRECTION

PATENT NO. : 10,040,944 B2
APPLICATION NO. : 14/594184
DATED : August 7, 2018
INVENTOR(S) : Gaspard Pardon et al.

Page 1 of 1

It is certified that error appears in the above-identified patent and that said Letters Patent is hereby corrected as shown below:

On the Title Page

Item "(30) Foreign Application Priority Data", change "1430002" to --1430002-4--.

Signed and Sealed this
Thirtieth Day of October, 2018

Andrei Iancu
*Director of the United States Patent and Trademark Office*